United States Patent [19]
Kagata

[11] 3,837,236
[45] Sept. 24, 1974

[54] LOCKING DIFFERENTIAL
[75] Inventor: Tooru Kagata, Toyota, Japan
[73] Assignee: Aisin Seiki Kabushiki Kaisha, Aichi Pref, Japan
[22] Filed: July 20, 1972
[21] Appl. No.: 273,532

[30] Foreign Application Priority Data
July 20, 1971 Japan.............................. 46-54349

[52] U.S. Cl. .................................................. 74/711
[51] Int. Cl. ............................................. F16h 1/44
[58] Field of Search ....................................... 74/711

[56] References Cited
UNITED STATES PATENTS

| | | |
|---|---|---|
| 2,397,673 | 4/1946 | Lewis .............................. 74/711 X |
| 2,971,404 | 2/1961 | Thornton .............................. 74/711 |
| 3,053,114 | 9/1962 | Singer .................................... 74/711 |
| 3,264,900 | 8/1966 | Hartupee ............................. 74/711 |
| 3,331,262 | 7/1967 | Mazziotti ............................. 74/711 |
| 3,362,258 | 1/1968 | Thornton .............................. 74/711 |

Primary Examiner—Samuel Scott
Assistant Examiner—J. Reep
Attorney, Agent, or Firm—Oblon, Fisher, Spivak, McClelland & Maier

[57] ABSTRACT

A locking differential applicable to a vehicle in which the relative rotation between a pair of side gears connected, respectively to the corresponding wheels of the vehicle is regulated by a pair of clutch means which are allowed to create their locking function by frictional resistance forces produced at the clutch means under the relative rotation, wherein the driving torque from an engine is transmitted to the side gears through a pinion shaft secured to a case rotatable thereby, and collar means disposed outside the side gears and the clutch means, the collar means being provided with cam surfaces thereon cooperating with the pinion shaft whereby the collar means are adapted for spreading toward the clutch means to further increase the frictional resistance forces.

6 Claims, 6 Drawing Figures

LOCKING DIFFERENTIAL

BACKGROUND OF THE INVENTION

1. Field Of The Invention

The present invention relates generally to a locking differential for a vehicle and more particularly to an improved means for restraining a faster rotation of one drive wheel when the wheel tends to race or accelerate because of being on a surface which offers comparatively little frictional resistance, such as mud or the like.

2. Description of The Prior Art

Conventionally, various locking differentials, especially two-pinion type locking differentials, have been proposed to restrain the faster rotation of one drive wheel under such circumstances mentioned before. The restraining means comprise clutch means for creating the locking relation between the side gears and the case, and cam means for causing the clutch means to move in the locking direction. The cam means is arranged generally within the side gears and the pinion gears. However, because the space within the side gears and the pinion gears is limited, the cam means is generally quite complex in construction. Therefore, particularly in a four-pinion type locking differential, it is difficult to arrange the cam means within the limited space. In addition, the cam means is arranged so as to actuate the clutch means through the side gears. Namely, the cam action allows the side gears to move toward the clutch means, and the side gears are utilized to increase the locking function of the clutch means. Thus, this cam action can create wear and burn in the side gears such that the useful life thereof will be reduced. Also, the splined engagement between the side gears and the pinion gears will be troubled as the wear of the clutch plates of the clutch means increases.

SUMMARY OF THE INVENTION

Therefore, it is an object of the present invention to provide an improved locking differential for obviating the above-mentioned various drawbacks.

It is another object of the present invention to provide an improved locking differential wherein the restraining means will be applied easily to any type of locking differential.

It is a further object of the present invention to provide an improved locking differential wherein the restraining means is arranged outside the side gears and the pinion gears.

It is another object of the present invention to provide an improved locking differential wherein the restraining means is simple in construction and comparatively low in cost.

The foregoing and other objects are attained according to the present invention through the provision of an improved locking differential wherein the restraining means comprises clutch means and collar means provided with cam surfaces thereon for cooperating with a rotatable pinion shaft through which the driving torque of an engine is transmitted to the side gears. The collar means is positioned outside the side gears and the pinion gears so that the collar means directly actuates the clutch means under a camming action between the collar means and the pinion shaft means.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several figures, and wherein.

DETAILED DESCRIPTION OF THE INVENTION

Figure 1:
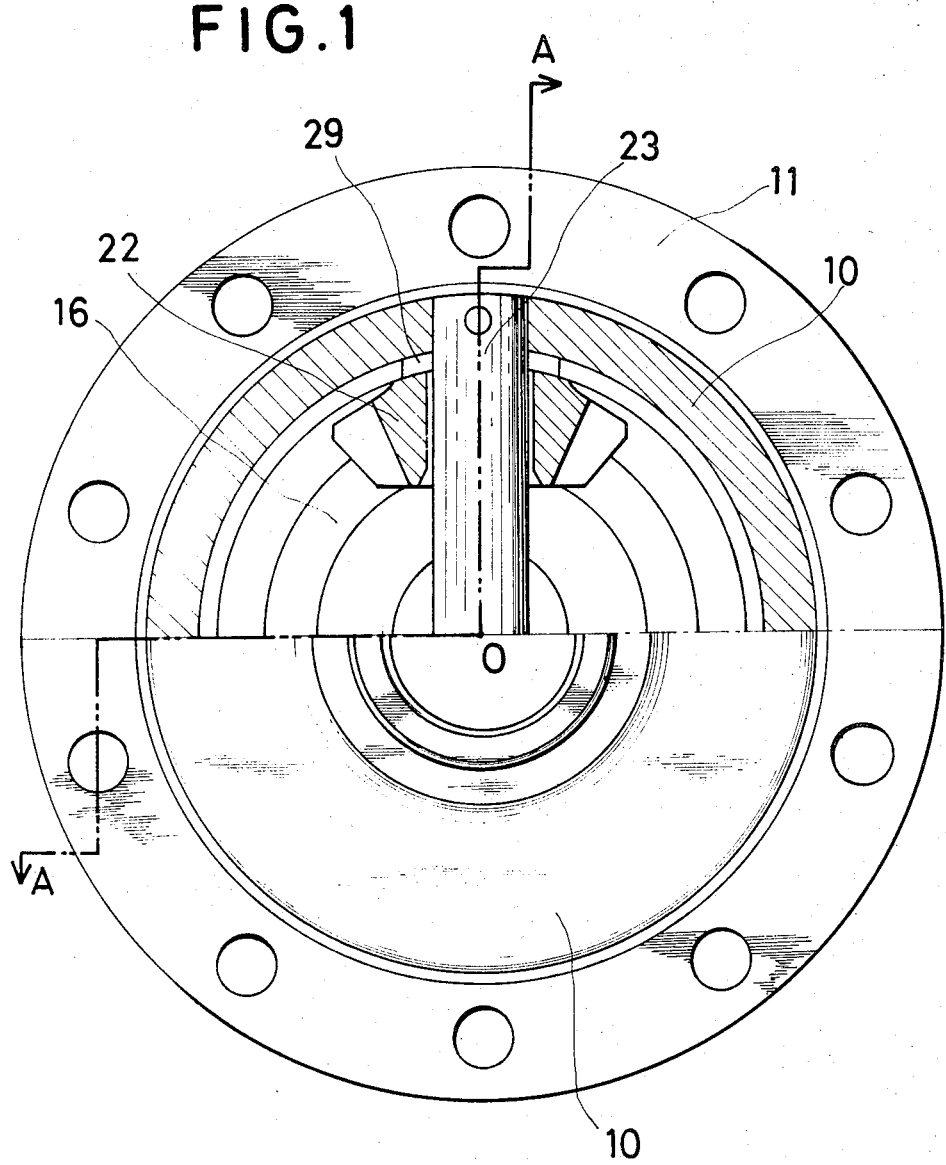
FIG. 1 is a front view with parts being shown in cross-section of one embodiment of the present invention, with the ring gear removed.
Figure 2:
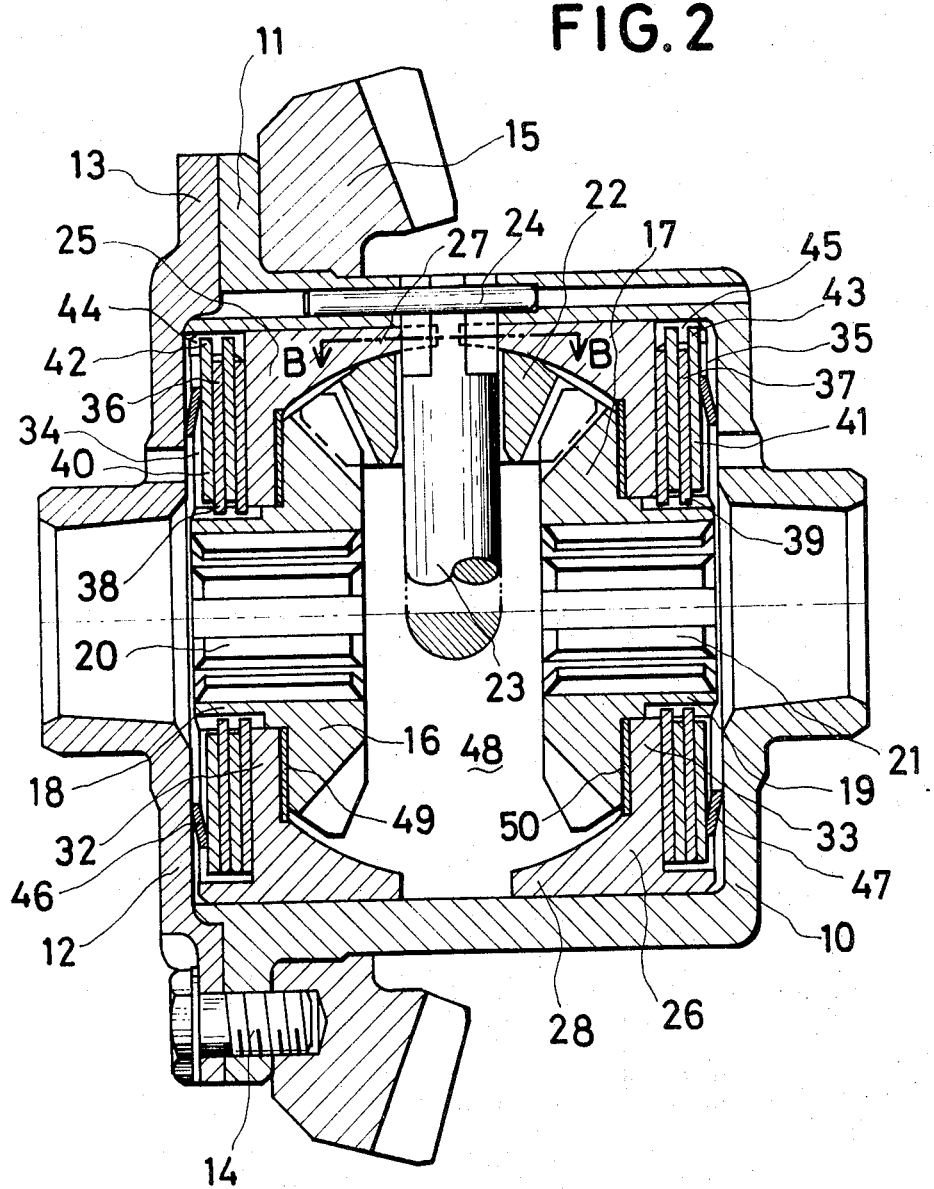
FIG. 2 is a cross-section view taken along the line A-O-A of FIG. 1.
Figure 3:
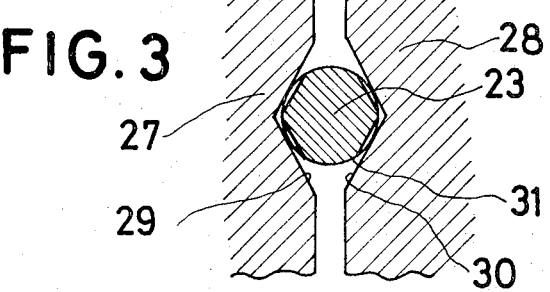
FIG. 3 is a cross-section view taken along the line B—B of FIG. 2.

Referring now to FIGS. 1, 2 and 3, wherein the construction of a two-pinion type locking differential including one embodiment of the present invention is illustrated, a case body 10 is shown being provided with a flange 11 and a case cover 12 being provided with a flange 13 is secured to the flange 11 of the case body 10 by bolts 14. A ring gear 15 is also secured to the flange 11 of the case body 10 with the bolts 14. The ring gear 15 is mechanically and operatively connected through a drive shaft, a propeller shaft and a transmission to an engine of the vehicle or power source, all of these not being shown, whereby the ring gear 15 is adapted for receiving the driving torque transmitted from the engine or the power source. A pair of side gears 16 and 17 are disposed within the case body 10 and include hubs 18 and 19 having a plurality of splines 20 and 21 formed respectively on the inner peripheries thereof for respective splined engagement with suitable axle shafts, not shown, being operatively connected to wheels, also not shown, of the vehicle. A pair of pinion gears 22, only one of which will be shown in FIGS. 1 and 2, are positioned in engagement with the side gears 16 and 17, being rotatably positioned on a pinion shaft 23 which is secured to the case body 10 by pins 24.

The numerals 25 and 26 respectively designate collars which are axially slidably disposed within the case body 10 being arranged so as to stride over the pinion gears 22 and the side gears 16 and 17. The collars 25 and 26, respectively, include axially extending annular flanges 27 and 28 at opposite ends of which are formed cam surfaces 29 and 30 engaged with the cam surface 31 of the pinion shaft 23, as viewed in FIG. 3. The collars 25 and 26 also include radially extending annular flanges 32 and 33.

A clutch assembly 34 is disposed between the case cover 12 and the radial flange 32 of the collar 25 and a further clutch assembly 35 is disposed between the case body 10 and the radial flange 33 of the collar 26. The clutch assemblies 34 and 35 comprise a plurality of inner clutch plates 36 and 37 being respectively keyed to the side gears 16 and 17 wherein the inner clutch plates 36 and 37 are inwardly extending lugs 38 and 39 slidably engaged with splines formed on the outer peripheries of the hubs 18 and 19 of the side gears 16 and 17. The clutch assemblies 34 and 35 further comprise a plurality of outer clutch plates 40 and 41 disposed respectively between the inner clutch plates 36 and the case cover 12 and between the inner clutch plates 37 and the case body 10. The outer clutch plates 40 and 41 have outwardly extending lugs 42 and 43 which are slidably disposed in grooves 44 and 45 formed on the collars 25 and 26 so that the outer clutch plates 40 and 41 are keyed to the collars 25 and 26. A dish spring 46 is disposed between the case cover 12 and the left side one of the outer clutch plates 40 and a further dish spring 47 is disposed between the case body 10 and the right side one of the outer clutch plates 41, as viewed in FIG. 2. Therefore, the inner clutch plates 36 and 37 and the outer clutch plates 40 and 41 are pre-loaded against the radially extending flanges 32 and 33 of the collars 25 and 26 under the action of dish springs 46 and 47. When relative rotation between the pinion shaft 23 and the collars 25 and 26 occurs, as explained later, the collars 25 and 26 will be expanded towards the clutch assemblies 34 and 35 so that the frictional resistance force produced between the inner clutch plates 36 and 37 and the outer clutch plates 40 and 41 will be further increased. At this time, the expanding movements of the collars 25 and 26 do not act against the side gears 16 and 17, between which are disposed washers 49 and 50. In addition, it is noted that the collars 25 and 26 are not disposed within a space 48 surrounded by the pinion gears 22 and the side gears 16 and 17. Accordingly, the locking differential arranged as described herein is easy to assemble though the space 48 is limited therein.

In operation, when the vehicle is going in a straight line, all of the case body 10, the pinion shaft 23, the pinion gears 22, the side gears 16 and 17 and the collars 25 and 26 rotate at the same rate. Accordingly, the drive torque transmitted from the engine or the power source is transmitted to the side gears 16 and 17 through the ring gear 15, the case body 10, the pinion shaft 23 and the pinion gears 22. At this time, the clutch assemblies 34 and 35 will not be performing their locking function because the frictional resistance force between the inner clutch plates 36 and 37 and the outer clutch plates 40 and 41 will not be produced.

Now assuming that the vehicle is in a turn, one axle shaft tends to turn faster than the other, whereupon one of the side gears 16 and 17, for example, the side gear 16, rotates faster than the other side gear, for example, the side gear 17. However, the clutch assemblies 34 and 35 are arranged for sliding corresponding to the difference in rotations between the side gears 16 and 17. Accordingly, the inner clutch plates 36 rotate with the side gear 16 and the inner clutch plates 37 rotate with the side gear 17, and the outer clutch plates 40 and 41 rotate with the collars 25 and 26 and thus with the case body 10 through the pinion shaft 23. In this time, the pinion gears 22 rotating with the case body 10 further rotate freely on the pinion shaft 23.

Whenever one wheel of the vehicle is on a road surface which offers comparatively little frictional resistance between the wheel and the road surface, as when the one wheel sinks in mud, it is scarcely possible that the one wheel receives any frictional torque or reaction force, from the road. Therefore, there is little tractive force for drawing the vehicle, whereby the one wheel will be raced or accelerated, and while the other wheel is capable of receiving frictional torque or reaction force, from the road, the vehicle however, will not be advanced because the one wheel is being raced.

The side gear, for example, the side gear 16, which is coupled through the axle shaft to the racing wheel, tends to rotate faster than the collar 25 being rotated with the case body 10, and the side gear 17, which is coupled through the other axle shaft to the other wheel, tends to rotate slower than the collar 26 being rotated with the case body 10. Therefore, the required frictional resistance force between the inner clutch plates 36 and the outer clutch plates 40 will be produced through the dish spring 46 so that the clutch assembly 34 creates its locking function between the inner and outer clutch plates 36 and 40. Thus the drive torque is transmitted from the case body 10 to the side gear 16 through the pinion shaft 23, the collar 25 and the clutch assembly 34, besides through the pinion shaft 23 and the pinion gears 22, whereby the rotation of the side gear 16 tends to reduce under the clutch assembly 34. In the same manner as the clutch assembly 34, the clutch assembly 35 also creates its locking function between the inner clutch plates 37 and the outer plates 41 by frictional resistance force between the plates 37 and 41. Namely, the drive torque is transmitted from the case body 10 to the side gear 17 through the pinion shaft 23, the collar 26 and the clutch assembly 35, and through the pinion shaft 23 and the pinion gears 22, so that the side gear 17 tends to rotate with the case body 10.

Thus, torque applied to the side gear 17 acts as the tractive force for moving the vehicle. During the aforedescribed operation, the collars 25 and 26 receive the frictional resistance force from the clutch assemblies 34 and 35 while the pinion shaft 23 tends to rotate with the case body 10. Accordingly, relative rotation between the collars 25 and 26 and the pinion shaft 23 will occur so that, as seen in FIG. 3, the lower surface of the cam surface 29 of the collar 25 will engage with the cam surface 31 of the pinion shaft 23 and the upper surface of the cam surface 30 of the collar 26 will engage with the cam surface 31 of the pinion shaft 23. This action spreads the collars 25 and 26 from the neutral position shown in FIG. 3 to the respective locked positions against the clutch assemblies 34 and 35. By these movements of the collars 25 and 26, the frictional resistance forces between the inner clutch plates 36 and 37 and the outer clutch plates 40 and 41 will be further increased.

As will be evident from the foregoing, the wheel operatively connected to the side gear 16 tends to rotate with the case body 10 while the wheel operatively connected to the side gear 17 tends to be driven by the torque transmitted from the case body 10, whereby the vehicle can start to move.

Figure 5:
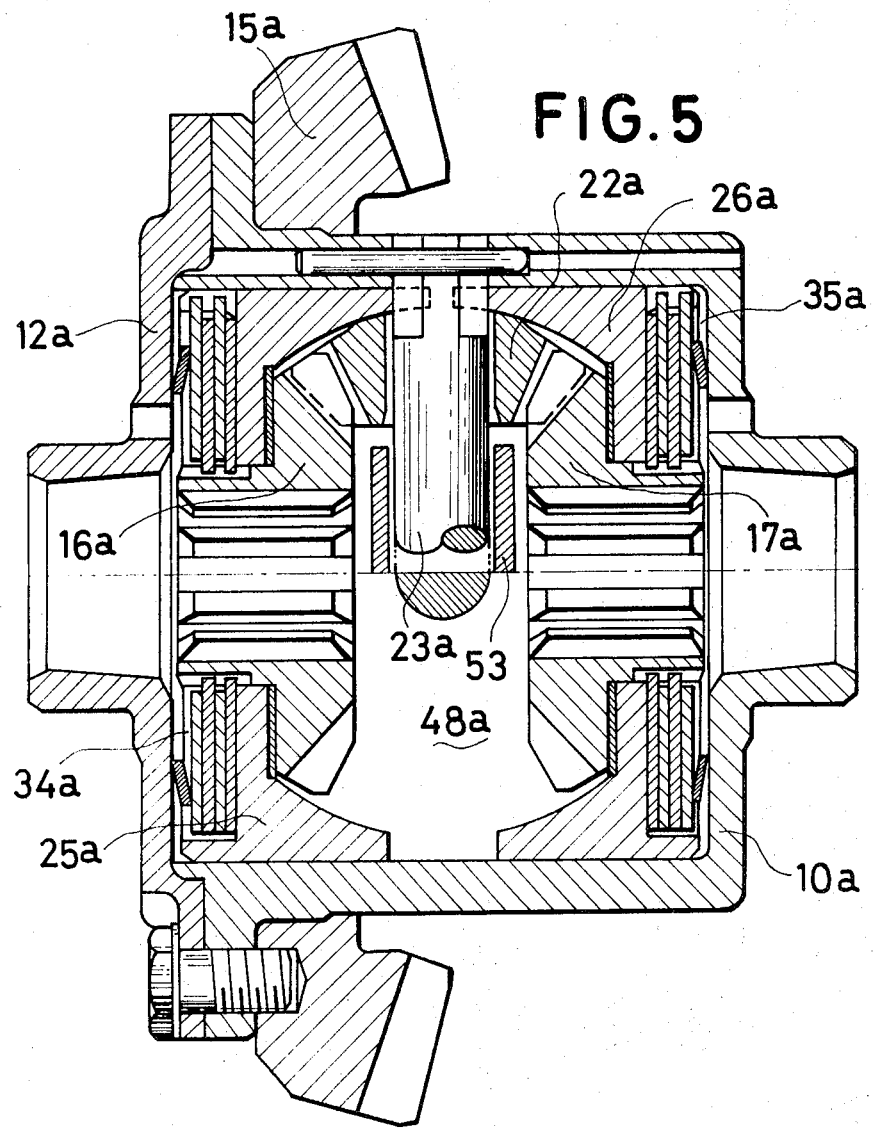
FIG. 5 is a cross-section view taken along the line C-O-C of FIG. 4.
Figure 4:
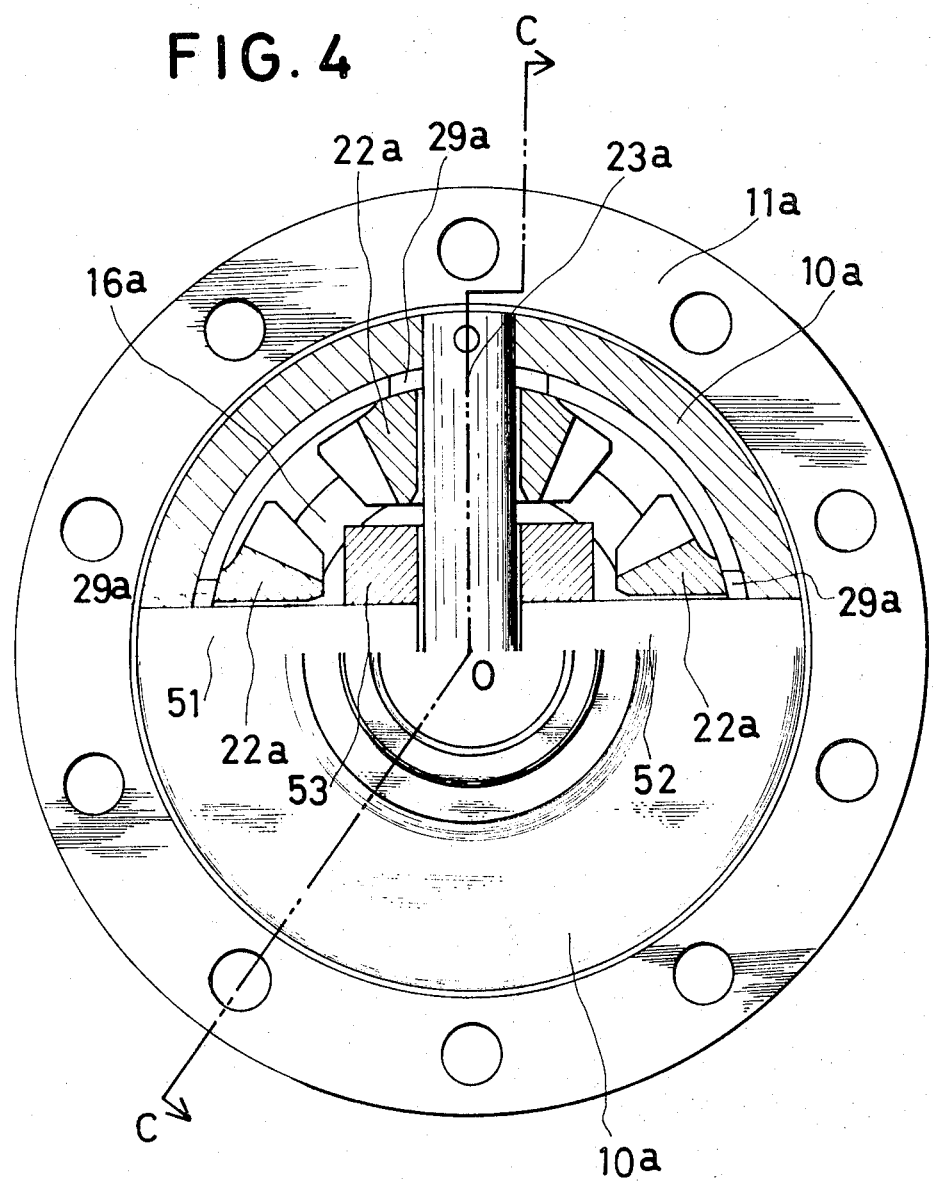
FIG. 4 is a front view similar to FIG. 1 showing another embodiment of the present invention.

Another embodiment of the present invention is shown in FIGS. 4 and 5, this arrangement showing a four-pinion type locking differential, wherein pinion gears 22a are arranged for engaging the side gears 16a and 17a and are rotatably positioned on pinion shafts 23a and 51 and 52. In the two-pinion type locking differential, the strength of the arrangement may become an undesirable problem as relative rotation between the side gears 16a and 17a occurs. For obviating this drawback, in the four-pinion type locking differential, the additional pinion shafts 51 and 52 are arranged beside the pinion shaft 23a. All of the pinion shafts 23a, 51 and 52 are fixed to the case body 10a at respective ends of the shafts and are supported by a block 53 at the other ends thereof. As shown in FIGS. 4 and 5, the space 48a is extremely limited. As is described above, however, the collars 25a and 26a are not arranged within the space 48a whereby the arrangement may be easily assembled. In addition, the four-pinion type locking differential has collars 25a and 26a which are formed with cam surfaces for engagement with the three pinion shafts. Therefore, the functions of the collars 25a and 26a which urge the clutch assemblies 34 and 35 in their locking directions will be further increased.

Figure 6:
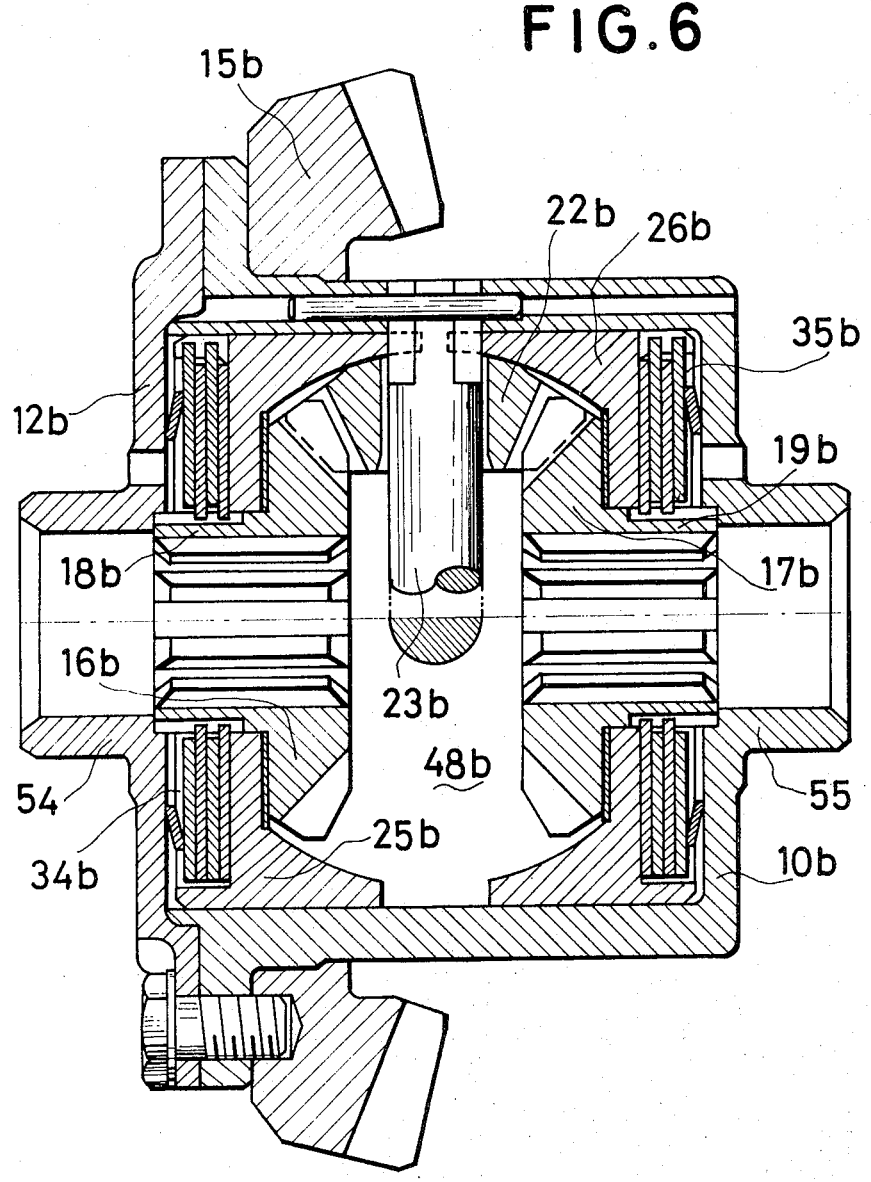
FIG. 6 is a cross-section view similar to FIG. 2 showing a further embodiment of the present invention.

A further embodiment of the present invention is shown in FIG. 6. In this arrangement the hubs 18b and 19b of the side gears 16b and 17b are arranged for contacting with boss portions 54 and 55 of the case cover 12b and the case body 10b. Namely, the thrust forces produced at the side gears 16b and 17b act on the boss portions 54 and 55 without the clutch assemblies 34b and 35b. Therefore, frictional burn between the collars 25b and 26b and the side gears 16b and 17b will be prevented and also the splined engagement between the pinion gears 22b and the side gears 16b and 17b will be more smooth.

Various other modifications and variations of the present invention are obviously possible in light of the above teachings. It is to be understood therefore, that within the scope of the appended claims, the invention may be practiced otherwise than as specifically described herein.

What is claimed as new and desired to be secured by letters patent of the United States is:

1. A locking differential for a vehicle with a power source comprising:
    a case rotated by a driving torque transmitted from said power source;
    a pair of side gears disposed within said case and operatively connected to wheels of said vehicle;
    pinion shaft means disposed between said side gears and rotatable with said case;
    a plurality of pinion gears rotatably disposed on said pinion shaft means, each of said pinion gears being in mesh with said side gears;
    a pair of collar means slidably disposed respectively outside said side gears and rotatable with said pinion shaft means;
    a pair of clutch means disposed in said case, each of said clutch means comprising a plurality of inner clutch plates operatively directly connected with each of said side gears and a plurality of outer clutch plates operatively directly connected with each of said collar means and movable therewith independent of said case, thereby to create their locking function by a frictional resistance force being produced upon relative rotation of said side gears; and
    cam means arranged between each of said collar means and said pinion shaft means for causing said collar means to move towards said clutch means upon the relative rotation of said collar means and said pinion shaft means.

2. A locking differential as set forth in claim 1, wherein said cam means comprises cam surfaces formed respectively on said collar means and said pinion shaft means.

3. A locking differential for a vehicle with a power source comprising:
    a case rotated by a driving torque transmitted from said power source;
    a pair of side gears disposed within said case and operatively connected to wheels of said vehicle;
    pinion shaft means disposed between said side gears and secured to said case thereby to rotate with said case;
    a pair of pinion gears rotatably disposed on said pinion shaft means, each of said pinion gears being in mesh with said side gears;
    a pair of collar means slidably disposed respectively outside said side gears and rotatable with said pinion shaft means;
    a pair of clutch means engaged respectively with said side gears and said collar means to create their locking function by a frictional resistance force being produced upon relative rotation of said side gears; and
    cam means arranged between each of said collar means and said pinion shaft means for causing said collar means to move towards the clutch means upon the relative rotation of said collar means and said pinion shaft means.

4. A locking differential as set forth in claim 3, wherein said side gears comprise hub portions on the outer peripheries thereof having splines formed thereon and engaging said clutch means, each of said hub portions being adapted for contacting said case.

5. A locking differential for a vehicle with a power source comprising:
    a case rotated by a driving torque transmitted from said power source,
    a pair of side gears disposed within said case and operatively connected to wheels of said vehicle;
    pinion shaft means disposed between said side gears including three pinion shafts secured respectively to said case thereby to rotate with said case;
    two pairs of pinion gears, one pair being rotatable on one of said pinion shafts and one each of the other pair being rotatable on the others of said shafts, respectively, each of said pinion gears being meshed with said side gears;
    a pair of collar means slidably disposed respectively outside said side gears and rotatable with said pinion shaft means;
    a pair of clutch means engaged respectively with said side gears and said collar means to create their locking function by a frictional resistance force being produced upon relative rotation of said side gears; and
    cam means arranged between each of said collar means and said pinion shaft means for causing said collar means to move toward said clutch means upon the relative rotation of said collar means and said pinion shaft means.

6. A locking differential for a vehicle with a power source comprising:
    a case rotated by a driving torque transmitted from said power source;
    a pair of side gears disposed within said case and operatively connected to wheels of said vehicle;
    pinion shaft means disposed between said side gears and rotatable with said case;

a plurality of pinion gears rotatably disposed on said pinion shaft means, each of said pinion gears being in mesh with said side gears;

a pair of collar means slidably disposed respectively outside said side gears and rotatable with said pinion shaft means;

a pair of clutch means engaged respectively with said side gears and said collar means to create their locking function by a frictional resistance force being produced upon relative rotation of said side gears, each of said clutch means comprising a plurality of inner clutch plates on said side gear, a plurality of outer clutch plates on said collar means and spring means for biasing all of said plates toward said collar means; and cam means arranged between each of said collar means and said pinion shaft means for causing said collar means to move toward said clutch means upon the relative rotation of said collar means and said pinion shaft means.

* * * * *